United States Patent [19]
Alvarado

[11] 3,736,833
[45] June 5, 1973

[54] MUSIC CHORD TEACHING DEVICE

[76] Inventor: Samuel Laboy Alvarado, Esparta St. No. 60, Reparto Apolo, Guaynabo, P.R. 00657

[22] Filed: Sept. 30, 1971

[21] Appl. No.: 185,257

[52] U.S. Cl.....................................84/473, 235/89
[51] Int. Cl..............................................G09b 15/02
[58] Field of Search........................................235/89; 84/471–475, 485

[56] References Cited
UNITED STATES PATENTS

| | | | |
|---|---|---|---|
| 2,832,252 | 4/1958 | Gabriel | 84/473 X |
| 3,338,126 | 8/1967 | Wiley et al. | 84/485 |
| 2,657,610 | 11/1953 | Carran | 84/473 |
| 3,335,948 | 8/1967 | Vorpahl | 235/89 |

*Primary Examiner*—Richard B. Wilkinson
*Assistant Examiner*—Lawrence R. Franklin
*Attorney*—Warren N. Low and Richard P. Matthews

[57] ABSTRACT

A music chord teaching device wherein a chord diagram is presented to indicate the proper finger positions for a stringed instrument, such as a guitar. The device comprises a two-sided graph, one side of which is provided with a music key selector means and the other side of which displays an associated group of chord diagrams. The indicia is so arranged as to present diagrams for three basic chords and three relative minor chords simultaneously. The key selector means side of the device is also provided with an indication of modulating notes between chord positions and sharps associated with a selected musical key.

12 Claims, 6 Drawing Figures

PATENTED JUN 5 1973
3,736,833
SHEET 1 OF 2
Fig.1
FRONT
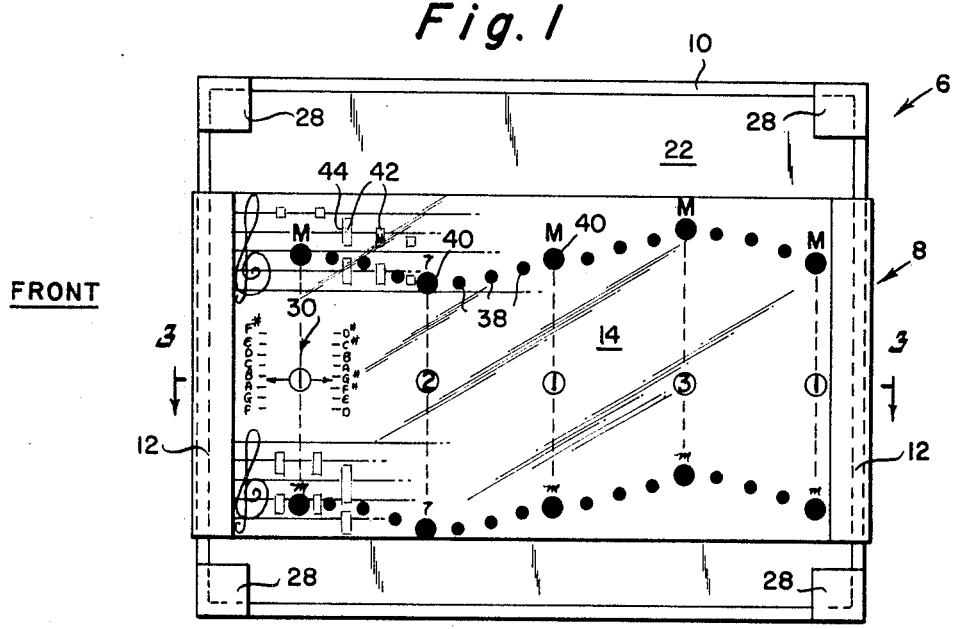
Fig. 2
BACK
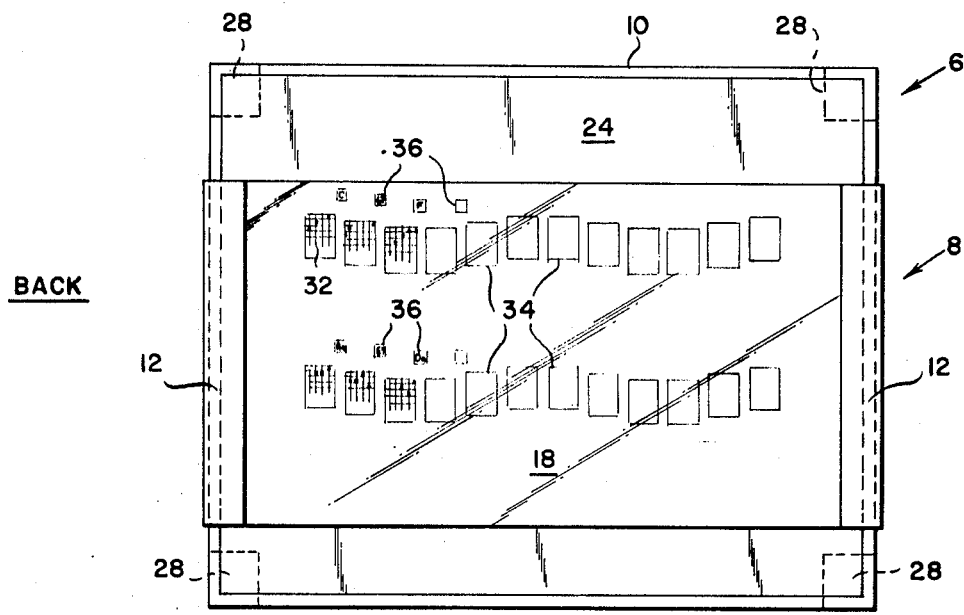
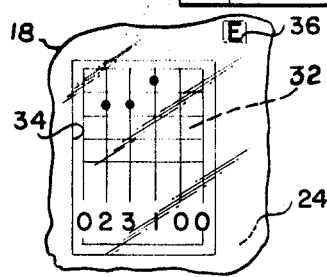
Fig.6
INVENTOR.
Samuel Laboy
Alvarado
BY
ATTORNEYS

MUSIC CHORD TEACHING DEVICE

This invention relates to a music chord teaching device and more particularly to a music chord teaching device for use in connection with a stringed instrument, such as a guitar.

Heretofore it has been known to use teaching guides in order to instruct music students in the proper positioning of the student's fingers for a given musical key. In prior known devices it has been possible to display relatively limited amounts of musical information in that the devices and charts make use of only one side of the chart material. Typical devices of this character are shown in U.S. Pat. to Wiley et al. No. 3,338,126, Orzada, No. 2,079,920, Wickersham, No. 605,157 and Gibson, No. 1,783,361.

In accordance with the present invention, however, a novel slide display is disclosed wherein both sides of a slide member cooperate with a fixed centrally located backing member which carries indicia-bearing apertured sheet means attached at selected positions in the region of the top and bottom of the fixed backing member. By interleaving pairs of sheets of the slide member with the indicia-bearing apertured sheet means on the fixed backing member, considerably more information is conveyed with a single setting of the teaching device of this invention. Furthermore, by moving the slide member vertically, i.e., up and down with respect to the fixed backing member and by displaying plural chord diagrams simultaneously, it becomes possible to display all the desired information in an extremely short travel dimension such as in approximately one inch of movement. It thus becomes possible to employ stop members on the fixed backing member whereby the entire unit becomes self-contained and inseparable. Not only is the teaching unit easy to use, but it is also attractive in appearance and inexpensive to manufacture.

The inherent advantages and improvements of the present invention will become more readily apparent upon considering the following detailed description of the invention and by reference to the drawings in which FIG. 1 is a front elevational view of a guitar chord teaching device of the present invention;

FIG. 2 is a rear elevational view of the guitar chord teaching device of the present invention;

FIG. 6 is an enlarged elevational view of one of the chord diagrams.

While the present invention will be described with respect to the use of the music chord teaching device as applied to a guitar, it is to be understood that the invention is applicable to stringed instruments generally.

Referring now to FIG. 1 of the drawings, there is illustrated an assembled composite of the chord teaching device indicated generally at 6. Slidable vertically, i.e., up and down on the chord teaching device is a slide mechanism indicated generally at 8 which slides with respect to a centrally located fixed backing member 10. This backing member 10 maY conveniently be made from a relatively thick piece of cardboard. The slide mechanism 8 is provided with substantially U-shaped slides 12 which recieve in clamping relationship the marginal edges of sheets 14, 16, 18 and 20. The U-shaped slides 12 may be made conveniently from preformed plastic. These plurality of sheets have marginal edges substantially coincident with a pair of opposed sides of the fixed backing member 10 in order that the slide mechanism may be clamped by the U-shaped slides 12 and move as a unit up and down on the fixed backing member 10.

Figure 3:
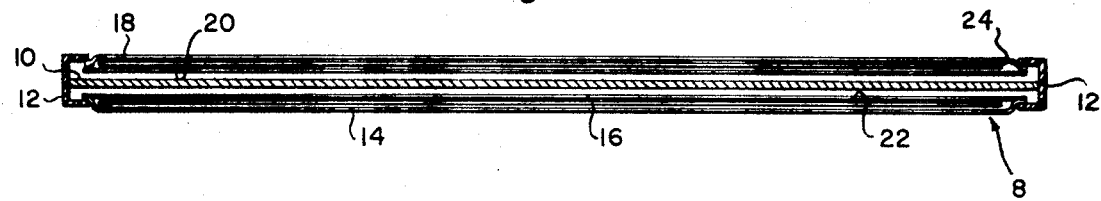
FIG. 3 is a plan view taken in horizontal cross section along line 3—3 of FIG. 1 and enlarged slightly for clarity.
Figure 4:
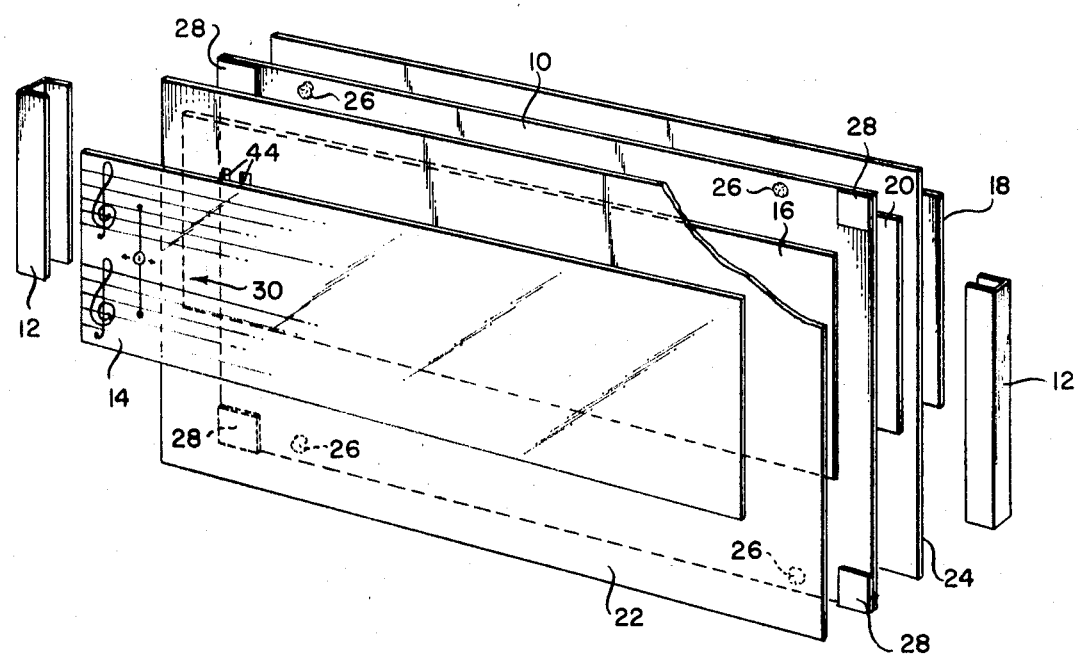
FIG. 4 is an exploded perspective view, with a portion partially broken away, illustrating the relationship of parts as seen in FIG. 1.

The centrally located fixed backing member 10 is provided on opposite sides thereof with apertured sheet means 22, 24 which are attached at selected positions in the region of the top and bottom of the fixed backing member as by means of adhesive spots 26 (FIG. 4). Apart from the attachment by means of the adhesive spots 26, the sheets 22 and 24 are not attached to the centrally located fixed backing member 10 whereby the sheets 22 and 24 may be interleaved between the sheets 14, 16, 18 and 20 of the slide mechanism 8. This is most clearly shown in FIGS. 3 and 4 wherein it is disclosed that sheet 22 is interleaved between a first pair of sheets 14 and 16 on the front side of the centrally located fixed backing member 10 and sheet 24 is interleaved between sheets 20 and 18 on the rear side of the centrally located fixed backing member 10. The outer sheets 14 and 18 of the slide mechanism 8 are transparent, being formed from a material such as celluloid, so that they cover and protect apertures 44 in sheet 22 and apertures 34 and 36 of sheet 24. The latter apertures are seen in FIG. 2 wherein apertures 34 permit the viewing of the chord diagrams 32 and smaller apertures 36 permit the viewing of the designation for the musical keys which are selected on the front side of the chord teaching device as will now be described.

Figure 5:
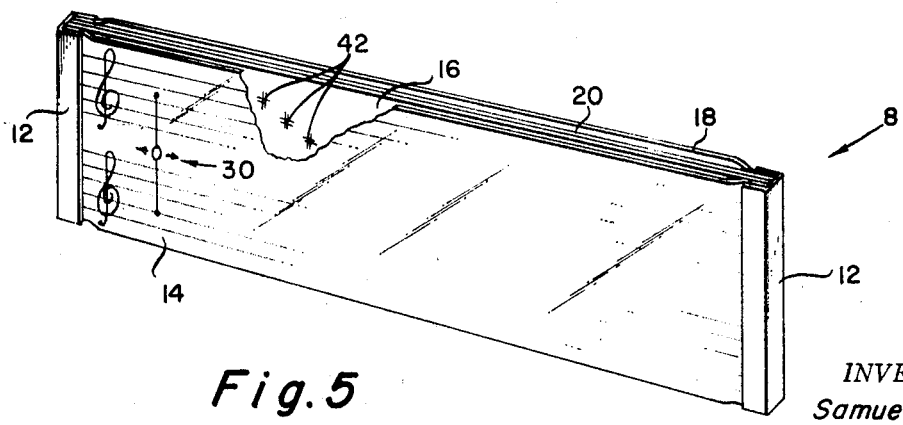
FIG. 5 is a perspective view, with a porton partially broken away, to illustrate the slide mechanism of the present invention.

Referring now to FIG. 1, a key selector means is indicated generally at 30 wherein the numeral 1 in a circle is inscribed or printed on transparent sheet 14 of the slide mechanism 8 with a pair of oppositely extending arrows indicating the selected key for both the basic chord, on the left of the key selector in FIG. 1, and the relative minor chord indicated on the right of the key selector in FIG. 1. The slide mechanism 8 is movable vertically, that is up and down, on the centrally located fixed backing member 10 until the U-shaped slides 12 of the slide mechanism contact stop members 28 which are secured to the centrally located fixed backing member 10. The indicia which indicates the chord appears on sheet 22 which lies directly beneath the celluloid sheet 14 of the slide mechanism 8. Also imprinted on outermost celluloid sheet 14 are a series of modulating notes 38 which are spaced between main chords 40 also on the celluloid sheet 14. Thus the student knows that after striking the main chord indicated at 40 he is to strike the series of modulating notes 38 until he repositions his fingers on the proper strings in order to strke the next main chord 40. The sheet 22 in addition to the printed musical scale traversed by arrow 30 is also provided with apertures 44 through which appear the sharp designations 42 which are printed on the inner sheet 16 in fornt of the fixed backing member 10 as is illustrated in both FIGS. 1 and 5.

Referring now to FIGS. 2 and 6, the manner by which the chord diagrams are displayed on the reverse of the device wll now be explained. The outer sheet 18 of the slide mechanism is transparent, and while it bears no indicia thereon, it serves to protect and cover apertures 34 and 36 in the sheet 24 attached to the centrally located fixed backing member 10 at selected top and bottom portions thereof by means of adhesive comparable to that shown at 26 in FIG. 4. The chord diagrams indicated by the numeral 32 are imprinted so as to be viewable when looking at the back side of the chord teaching device 6. Also imprinted on the inner sheet 20 are the key designations which are viewable through apertures 36 and the sheet 24. The musical key, as selected at 30 in FIG. 1, also appears through the aperture 36 on the back or reverse side of the chord teaching device 6. In other words, the apertures 34 form a frame for three consecutive basic chords printed above three consecutive minor chords. The key designations as seen through apertures 36 are so laid out or positioned on sheet 20 that only three major chord keys and three minor chord keys are viewable through apertures 36 for a given key selection.

From the typical chord diagram for the key of E as illustrated in FIG. 6, it is learned from the sequence of numbers 0 2 3 1 0 0 that the second finger is placed on the second string, the third finger is placed on the third string, the first finger is placed on the fourth string, and no other finger is placed on any other string, for example.

The sequence of events of playing the chords is to strike the main chord, then strike three modulating notes while repositioning one's fingers to the second basic chord, striking that note followed by three modulating notes, reverting again to the first basic chord, striking it followed by three modulating notes, and then proceeding to the third basic chord. After the third basic chord is struck and the three modulating notes thereafter, the sequence is begun again. This is all indicated in FIG. 1 by the main designation of numerals "1, 2, 1, 3, 1" within the circles. The same may be practiced with the relative minor chords.

From the foregoing it will be observed that a substantial amount of information is available to the student by use of the chord teaching device of the present invention.

The chord diagrams are so laid out that approximately only 1 inch of vertical movement of the slide mechanism 8 is required to encompass the entire range of key selections whereby stop members 28 may be employed to limit the amount of movement of the slide mechanism and provide a compact unit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A music key and chord diagram device comprising:
   a. a centrally located fixed backing member,
   b. apertured sheet means attached at selected positions in the region of the top and bottom of said backing member,
   c. said apertured sheet means comprising a first sheet on one side of said fixed backing member and a second sheet on the opposite side of said fixed backing member, said first and second sheets being attached at their top and bottom to said fixed backing member,
   d. slide means slidable up and down on said fixed backing member, said slide means comprising a pair of inner sheets inserted between said apertured sheet means and said fixed backing member on opposite sides thereof and an outer sheet positioned exteriorly of one of said sheets of said apertured sheet means, and edge clamping means holding the side edges of said inner and outer sheets together whereby said slide means moves as a unit up and down on said fixed backing member,
   e. indicia means constituting a music key selector on said slide means and said apertured sheet means on one side of said fixed backing member,
   f. and indicia means constituting a chord diagram means selectively displaying chords in the key indicated by said selector indicia means, said chord indicia means located on the opposite side of said fixed backing member on said slide means and said apertured sheet means.

2. A music key and chord diagram device as defined in claim 1 including protruding stop means affixed to said fixed backing member and engageable by said slide means to limit up and down movement of said slide means.

3. A music key and chord diagram device as defined in claim 1 wherein said outer sheets are transparent.

4. A music key and chord diagram device as defined in claim 1 wherein the apertures in said apertured sheet means and the chord diagrams on said indicia bearing sheets are so arranged to reveal three basic chords and three relative minor chords for a given position of said music key selector means.

5. A music key and chord diagram device as defined in claim 1 wherein said slide means includes a second outer sheet positioned exteriorly of the other of said sheets of said apertured sheet means.

6. A music key and chord diagram device as defined in claim 1 wherein said edge clamping means is a substantially U-shaped preformed plastic member.

7. A music key and chord diagram device comprising:
   a. a centrally located fixed backing member,
   b. apertured sheet means attached at selected positions in the region of the top and bottom of said fixed backing member,
   c. slide means slidable up and down on said fixed backing means, said slide means comprising:
      1. a first pair of sheets inserted between said apertured sheet means and said fixed backing member on opposite sides of said fixed backing member,
      2. a second pair of sheets positioned exteriorly of said apertured sheet means on opposite sides of said fixed backing member,
      3. said first and second pair of sheet means having marginal edges substantially coincident with a pair of opposed sides of said fixed backing member,
      4. and edge clamping means for holding the marginal edges of said first and second pairs of sheets together whereby said slide means moves as a unit up and down on said fixed backing member,
   d. indicia means constituting a music key selector means on said slide means and said apertured sheet means, e. indicia means constituting a chord diagram means selectively displayed by said slide means and said apertured sheet means, f. and stop means affixed to said fixed backing member and engageable by said slide means to limit the up and down movement of said slide means.

8. A music key and chord diagram device as defined in claim 7 wherein said music key selector means also designate modulating notes between chord positions.

9. A music key and chord diagram device as defined in claim 7 wherein said edge clamping means is a substantially U-shaped performed plastic member.

10. A music key and chord diagram device as defined in claim 7 wherein said key selector means also indicates sharp notes for a given selected key.

11. A music key and chord diagram device as defined in claim 7 wherein said second pair of sheets positioned exteriorly of said apertured sheet means are transparent and serve to cover and protect the apertures in said apertured sheet means.

12. A music key and chord diagram device as defined in claim 7 wherein the apertures in said apertured sheet means and the chord diagrams on said indicia bearing sheets are so arranged to reveal three basic chords and three relative minor chords for a given position of said music key selector means.

* * * * *